United States Patent [19]

Tsukihashi

[11] 4,427,931
[45] Jan. 24, 1984

[54] SPEED CONTROL APPARATUS FOR DIRECT CURRENT MOTOR

[75] Inventor: Akira Tsukihashi, Oora, Japan

[73] Assignees: Sanyo Electric Co., Ltd., Moriguchi; Tokyo Sanyo Electric Co., Ltd., Gunma, both of Japan

[21] Appl. No.: 310,066

[22] Filed: Oct. 9, 1981

[30] Foreign Application Priority Data

Oct. 17, 1980 [JP] Japan .................. 55-146044
Oct. 22, 1980 [JP] Japan .................. 55-148480

[51] Int. Cl.³ .............................................. H02P 5/06
[52] U.S. Cl. .................................... 318/317; 318/341; 318/345 B
[58] Field of Search ............ 318/345 B, 345 C, 345 F, 318/345 G, 341, 139, 294, 317, 346

[56] References Cited

U.S. PATENT DOCUMENTS

| | | | |
|---|---|---|---|
| 3,475,672 | 10/1969 | Oltendorf | 318/317 X |
| 3,560,828 | 2/1971 | Kobayashi et al. | 318/345 F |
| 3,562,615 | 2/1971 | Nasu et al. | 318/345 B |
| 3,855,511 | 12/1974 | Smith | 318/345 B |
| 3,942,085 | 3/1976 | Tadakuma et al. | 318/341 |
| 3,987,349 | 10/1976 | Shibata et al. | 318/345 G |
| 4,087,726 | 5/1978 | Bourguet et al. | 318/345 G |
| 4,384,241 | 5/1983 | Stillhard | 318/317 |

Primary Examiner—J. V. Truhe
Assistant Examiner—W. E. Duncanson, Jr.
Attorney, Agent, or Firm—Darby & Darby

[57] ABSTRACT

A speed control apparatus for a direct current motor comprises a bridge circuit having an armature in one side thereof, a direct current voltage source, and a series connection of a switching transistor and an inductor inserted between the direct current voltage source and the bridge circuit. A detecting transistor detects an unbalanced voltage of the bridge circuit and control transistors are responsive to the detection to control the switching transistor to be turned on or off. The inductor stores a magnetic energy when the switching transistor is turned on and supplies an electromotive force induced by the stored magnetic energy to the bridge circuit when the switching transistor is turned off. To that end, a diode or a transistor cooperates with the inductor and the bridge circuit to constitute a closed loop. A capacitor is connected in parallel with the armature, thereby to restrict the operation of the detecting transistor and thus the on/off-period of the switching transistor.

9 Claims, 10 Drawing Figures

SPEED CONTROL APPARATUS FOR DIRECT CURRENT MOTOR

BACKGROUND OF THE INVENTION

1. Field of the Invention

The present invention generally relates to a speed control apparatus for a direct current motor. More specifically, the present invention relates to a speed control apparatus for controlling a rotation speed of a direct current motor to a constant speed by controlling a supply of an electric power to a bridge circuit including an armature of the direct current motor the speed of which is to be controlled.

2. Description of the Prior Art

Figure 1:
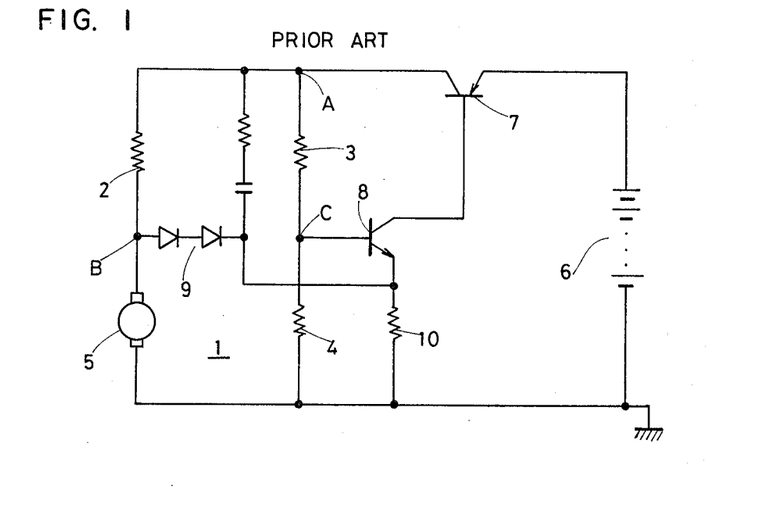
FIG. 1 is a schematic diagram showing one example of a conventional electronic governor which constitutes the background of the present invention.

Conventionally a speed control apparatus of a non-contact type referred to as an electronic governor has been put into practical use for the purpose of controlling the speed of a micromotor employed as a prime mover of a tape recorder, for example. FIG. 1 is a schematic diagram of one example of a conventional electronic governor which constitutes the background of the invention. Referring to FIG. 1, a bridge circuit 1 is constituted with resistors 2, 3 and 4 of an armature 5 of a direct current motor. The emitter-collector path of a supply control transistor 7 is connected between one supply point A of the bridge circuit 1 and a direct current voltage source 6. The base of a detecting transistor 8 is connected to one unbalanced voltage detecting point C of the bridge circuit 1. The other unbalanced voltage detecting point B is connected to the emitter of the detecting transistor 8 through a diode 9 for providing a reference voltage. The collector of the detecting transistor 8 is directly connected to the base of the supply control transistor 7. The emitter of the detecting transistor 8 is connected to the ground through a resistor 10, through which a forward current is allowed to flow through the diode 9, whereby the forward drop voltage is utilized as a reference voltage for the transistor 8. A variation of the counter electromotive force in the armature in proportion to a variation of the number of revolutions of the motor is detected by detecting a difference voltage between the unbalanced voltage of the bridge circuit 1 and the reference voltage being applied to the diode 9 by means of the transistor 8. The detected difference voltage is amplified by the transistor 8 and is applied to the base of the supply control transistor 7. The supply control transistor 7 becomes conductive with the degree of conduction associated with the voltage in proportion to the difference voltage being applied to the base thereof, whereby the magnitude of the direct current voltage being applied to the supply point A to the bridge circuit 1 is controlled. Thus, control is made such that a counter electromotive force in the armature 5 may be constant, whereby the direct current motor including the armature 5 is controlled to a constant speed.

With such conventionally known electronic governor as shown in FIG. 1, a voltage drop is caused between the emitter and base of the supply control transistor because the supply control transistor 7 inserted between the direct current voltage source 6 and the bridge circuit 1 operates in a linear region. Accordingly, such conventional electronic governor involved a disadvantage that power consumption is increased due to such voltage drop and the life of a battery becomes shorter in the case where a battery is employed as the direct current voltage source 6. More specifically, since such conventional electronic governor has achieved speed control of a direct current motor by changing a voltage drop across an internal impedance of a supply control transistor 7, a problem was involved that a power loss is unavoidably caused due to such voltage drop.

SUMMARY OF THE INVENTION

Briefly described, the present invention comprises a series connection of a switching means and an inductor means, inserted in a current path between a bridge circuit having an armature of a direct current motor in one side thereof and a direct current voltage source. The switching means is responsive to detection of the unbalanced voltage of the bridge circuit to be turned on or off. When the switching means is turned on, a current is supplied from the direct current voltage source to the bridge circuit through the switching means and the inductor means. When the switching means is turned off, no current is supplied from the direct current voltage source and an electromotive force induced by a magnetic energy previously stored in the inductor means is supplied to the bridge circuit. A diode or a transistor is employed for the purpose of constituting a closed loop for supplying the induced electromotive force from the inductor to the bridge circuit.

According to the present invention, no current flows from the direct current voltage source during a time period when the switching means is turned off and accordingly any energy loss due to a voltage drop as in the case of a conventional electronic governor is evaded as a matter of principle. Therefore, according to the present invention power consumption can be drastically reduced as compared with a conventional one and the life of a battery can be prolonged even in the case where a battery is employed as the direct current voltage source. Since a bridge circuit is utilized in conjunction with a speed control as in the case of a conventional electronic governor, a circuit configuration of the present invention does not become complicated. Meanwhile, no current is supplied from the direct current voltage source during a time period when the switching means is turned off and accordingly no electric power is supplied to the bridge circuit during that time period unless the inductor means is provided and the rotation of the motor becomes not to be preferred. However, according to the present invention the inductor means is inserted in a current path between the switching means and the bridge circuit and therefore a current due to a magnetic energy stored in the inductor means flows into the bridge circuit during a time period when the switching means is turned off, whereby such an inconvenience as described above is avoided.

A transistor may be employed by way of an example of the switching means. The transistor operates in a saturated region when the same is turned on. Accordingly, even if a transistor is employed as the switching means, the state of the transistor is switched merely between a cutoff-state and a saturated state and no voltage drop takes place in such switching transistor.

In a preferred embodiment of the present invention, a first capacitor means is preferably connected in parallel with the armature of the motor. One end of the armature serves as an unbalanced voltage detecting point and the other end of the armature is connected to the ground. A detecting means such as a transistor is connected to the unbalanced voltage detecting point. Therefore, the operation of the detecting transistor is defined by the first capacitor means and as a result the on-period and the off-period of the switching means is defined. Thus, according to the embodiment in description the repetition period between the on-state and off-state of the switching means can be restricted through cooperation of the first capacitor means with the inductor means.

By employing a transistor to constitute a closed loop for allowing for a current due to the magnetic energy stored in the inductor means through the bridge circuit and thus the armature of the motor, a voltage drop does not take place and the above described current can be supplied with efficiency, as compared with a case where a diode is employed.

In another preferred embodiment of the present invention, a second capacitor means is connected to the inductor means at the side of the bridge circuit substantially in parallel with the bridge circuit. A ripple component included in the direct current voltage being applied to the bridge circuit is effectively removed by means of the second capacitor means, whereby a more stabilized speed control of the direct current motor can be performed.

Accordingly, a principal object of the present invention is to provide a speed control apparatus for a direct current motor, in which energy consumption can be reduced as compared with a conventional one.

One aspect of the present invention resides in a speed control apparatus for a direct current motor including a series connection of a switching means and an inductor means between a bridge circuit having an armature of a motor in one side thereof and a direct current voltage source, whereby a current is supplied to the armature of the motor by the magnetic energy stored in the inductor means during a time period when the switching means is turned off.

Another aspect of the present invention resides in a speed control apparatus of a direct current motor employing a transistor as a switching means, which transistor is adapted to operate in a saturated region when the same is turned on, whereby a voltage drop across the transistor is eliminated.

A further aspect of the present invention resides in a speed control apparatus for a direct current motor wherein a current due to the magnetic energy stored in the inductor means is effectively supplied to the bridge circuit and thus to the armature of the motor.

Still a further aspect of the present invention resides in a speed control apparatus for a direct current motor having a capacitor connected in parallel with an armature of a direct current motor, which capacitor serves to define the on/off-period of the switching means.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4E are graphs showing waveforms for explaining the operation of the embodiment, wherein FIG. 4A shows the base current of a first control transistor including an actual ripple and a means value and FIGS. 4B, 4C and 4D show the collector voltage of the switching transistor for different values of the bias current, and FIG. 4E shows a voltage Va at the supply point A in the above described respective cases;

DESCRIPTION OF THE PREFERRED EMBODIMENTS

Figure 2:
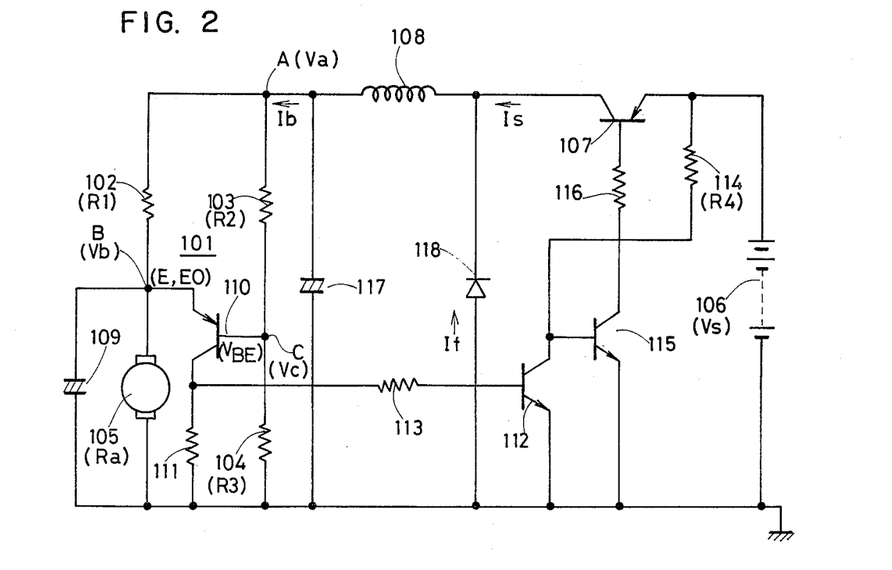
FIG. 2 is a schematic diagram showing one embodiment of the present invention.

FIG. 2 is a schematic diagram showing one embodiment of the present invention. Referring to FIG. 2, a bridge circuit 101 comprises resistors 102, 103 and 104 and an armature 105 of a direct current motor. A direct current voltage source 106 is connected to supply a direct current voltage to a supply point A of the bridge circuit 101. A series connection of a switching transistor 107 and an inductor 108 is inserted in a current path between the direct current voltage source 106 and the supply point A. The switching transistor 107 is connected such that the same is controlled to be turned on or off by means of transistors 112 and 115 constituting a control means.

The bridge circuit 101 comprises two unbalanced voltage detecting points B and C and the armature 105 is connected between one unbalanced voltage detecting point B and the ground, thereby to constitute one side of the bridge circuit 101. A capacitor 109 is connected in parallel with the armature 105 to restrict the on/off-period, i.e. the oscillation frequency of the switching transistor 107. One detecting point B is connected to the emitter of an unbalanced voltage detecting transistor 110 and the other unbalanced voltage detecting point C is connected to the base of the transistor 110. The collector of the transistor 110 is connected to the ground through a resistor 111. An output voltage associated with a difference voltage between the voltages Vb and Vc at the two unbalanced voltage detecting points B and C, respectively, is obtained from the collector of the detecting transistor 110.

The collector of the unbalanced voltage detecting transistor 110 is connected to the base of a first control transistor 112 through a resistor 113. The emitter of the first control transistor 112 is directly connected to the ground and the collector thereof is directly connected to the base of a second control transistor 115 and is also connected through a resistor 114 to the plus terminal of the direct current voltage source 106, i.e. the emitter of the switching transistor 107. The emitter of the second control transistor 115 is directly connected to the ground and the collector thereof is connected through a resistor 116 to the base of the previously described switching transistor 107. A smoothing capacitor 117 is connected substantially in parallel with the bridge circuit 101 for the purpose of reducing a ripple component included in the voltage Va at the supply point A.

One feature of the present invention is that when the switching means 107 is turned on an electric power is supplied from the direct current voltage source 106 to the bridge circuit 101 and when the switching means 107 is turned off a current is supplied from the magnetic energy stored in the inductor 108 when the switching means 107 was turned on. To that end, a diode 118 is provided for the purpose of constituting a directional closed loop together with the inductor 108 and the bridge circuit 101. More specifically, the diode 118 is connected, with the opposite polarity, to the direct current voltage source 106 between the inductor 108 at the direct current voltage source and the ground.

Let it be assumed that the direct current resistances of the resistors 102, 103 and 104 constituting the bridge circuit 101 and the armature 105 of the motor be R1, R2 and R3 and Ra, respectively. Further assuming that the counter electromotive force on the occasion of the rated number of revolutions of the armature 105 of the motor is E0, the voltage between the base and the emitter of the detecting transistor 110 is $V_{BE}$, a direct current electric current flowing through the armature 105 in Im and a direct current electric current flowing through the series connection of the resistors 103 and 104 is I1, then the following equations (1) and (2) are obtained:

$$(R2+R3)I1=(R1+Ra)Im+E0 \quad (1)$$

$$R1 \cdot Im + V_{BE} = R2 \cdot I1 \quad (2)$$

By canceling the electric current I1 from the above described equations (1) and (2), the following equation (3') is obtained:

$$E0 = \frac{R2 + R3}{R2} V_{BE} - \frac{R2 \cdot Rm - R1 \cdot R3}{R2} Im \quad (3')$$

Referring to the above described equation (3'), the first term of the right side defines the speed of the direct current motor and the second term of the right side is associated with the load characteristic of the direct current motor. In actuality, the second term is sufficiently small as compared with the first term in the right side of the above described equation and hence the above described equation (3') may be expressed as follows:

$$E0 = \frac{R2 + R3}{R2} V_{BE} \quad (3)$$

The respective resistance values R1, R2, R3 and Ra are selected in advance so that the following formula (4) may be established.

$$R2 \cdot Ra - R1 \cdot R3 > 0 \quad (4)$$

Now that the structural features of the embodiment were described, the operation of the FIG. 2 embodiment will be described in the following.

When the voltage Vs is supplied from the direct current voltage source 106, a bias current flows through the resistor 114 to the second control transistor 115. The second control transistor 115 is then reversed to an on-state and the switching transistor 107 is reversed to an on-state by virtue of the above described reversing operation of the second control transistor 115. When the switching transistor 107 is reversed to an on-state, a current Is is supplied from the collector of the switching transistor 107 through the inductor 108 to the bridge circuit 101. Since the counter electromotive force E is small when the number of revolutions of the motor is small, the detecting transistor 110 remains less biased. Therefore, the first control transistor 112 is turned off and the second control transistor 115 and the switching transistor 107 are turned on and a current is supplied to the bridge circuit 101.

When the number of revolutions of the motor increases from such situation and the counter electromotive force E exceeds E0, the detecting transistor 110 so far in a less biased state turns to a more biased state. As a result, the first control transistor 112 being supplied with a base bias from the collector of the detecting transistor 110 is turned on and the second control transistor 115 is turned off accordingly. When the second control transistor 115 is turned off, the switching transistor 107 being controlled by the second control transistor 115 is turned off and a current Is being supplied to the bridge circuit 101 becomes 0. When the switching transistor 107 turns to an off-state, an electromotive force is generated in the inductor 108 and a current flows through the diode 118 to the bridge circuit 101 by virtue of the induced electromotive force. Assuming that the current flowing through the diode 118 is If and a current flowing into the bridge circuit 101 is Ib, Ib is expressed by the following equation:

$$Ib = Is + If$$

When the switching transistor 107 is turned off, a potential Va at the supply point A of the bridge circuit 101 decreases in accordance with a curve determined by the inductor 108, the smoothing capacitor 117 and the load of the bridge circuit 101. The potential Vc at the unbalanced voltage detecting point C decreases in accordance with the following relation with respect to the supply point A:

$$Vc = \frac{R3}{R2 + R3} Va$$

However, the fall of the potential Vb at the unbalanced voltage detecting point B is delayed due to the electric charge stored in the capacitor 109. Therefore, the detecting transistor 110 maintains a more biased state during that period of time. When the electric charge stored in the capacitor 109 is discharged, the potential Vb at the unbalanced voltage detecting point B decreases and the detecting transistor 110 shifts to a less biased state. When the detecting transistor 110 shifts to a less biased state, the first control transistor 112 is reversed to an off-state and the second control transistor 115 is turned to an on-state. As a result, the switching transistor 107 turns to an on-state and a current Is is supplied through the switching transistor 107 from the direct current voltage source 106 to the bridge circuit 101. The potential Va at the supply point A again increases by virtue of the above described operation; however, the rise of the potential Vb at the unbalanced voltage detecting point B is delayed by means of the capacitor 109. Accordingly, the detecting transistor 110 is maintained in a less biased state during that period of time. When the potential Vb at the unbalanced voltage detecting point B decreases to a predetermined value, the detecting transistor 110 is again brought to a more biased state.

A change of the potential Va at the above described supply point A and the bias point of the detecting transistor 110 are calculated by the following equations:

$$V_c = \frac{R3}{R2 + R3} Va$$

$$Vb = \frac{Ra}{Ra + R1}(Va - E0) + E0 = \frac{Ra}{Ra + R1} Va + \frac{R1}{Ra + R1} E0.$$

The base-emitter voltage $V_{BE}$ of the detecting transistor 110 is given by the following equation (5).

$$V_{BE} = Vb - Vc \quad (5)$$

$$V_{BE} = \frac{Ra \cdot R2 - R1 \cdot R3}{(Ra + R1)(R2 + R3)} Va + \frac{R1}{Ra + R1} E0$$

As is clear from the above described equation (5), it follows that the bias point of the detecting transistor 110 changes depending on a ripple in the voltage Va being applied to the supply point A.

Since the respective resistance values have been properly selected so that the previously described formula (4) may be established, as described previously, it follows that the switching transistor 107 is on/off controlled responsive to the output voltage of the above described detecting transistor 110 and the oscillating operation is maintained. The oscillating operation is thus performed by the above described circuit and the oscillation frequency is determined by the inductor 108 and the capacitors 109 and 117. The oscillation frequency is selected to be 20 kHz to 100 kHz so that the same may be sufficiently large as compared with a commutating waveform of the direct current motor and in consideration of a possible audible noise due to vibration of the inductor.

Insofar as the operation in terms of a direct current is concerned, a controlling operation of the bridge circuit is performed in a conventional manner and the detecting transistor 110 functions to make the counter electromotive force E0 constant irrespective of the load current of the motor and a proper voltage Va is applied to the supply point A of the bridge circuit 101 due to an on/off operation of the switching transistor 107. The motor is thus driven in accordance with the above described operation; however, since a supply of an electric current from the direct current voltage source 106 is made in a periodical manner through the switching transistor 107 which is on/off controlled, a consumed electric power is reduced and the life of a battery being used as the direct current voltage source 106 can be drastically prolonged.

Now referring to the FIG. 2 embodiment, how the voltage Va applied to the bridge circuit 101 is controlled will be specifically described with reference to FIGS. 3 and 4A to 4E.

Referring to FIG. 2, assuming that the operation threshold value of the second control transistor 115 is Vth, then the operation condition of the transistor 115 is expressed by the following formulas (6') and (7'):

$$I_C > \frac{Vs - Vth}{R4} \quad (6')$$

$$I_C < \frac{Vs - Vth}{R4} \quad (7')$$

where Vs is a voltage of the direct current voltage source 106, $I_C$ is a collector current of the first control transistor 112 and R4 is a resistance value of the resistor 114. Assuming that a current amplification factor of the first control transistor 112 is $h_{FE}$, then the following equation (8) is obtained:

$$I_C = h_{FE} \cdot I_B \quad (8)$$

where $I_B$ is a base current of the transistor 112. Accordingly, the above described formulas (6') and (7') are expressed by the following formulas (6) and (7), respectively:

$$I_B > \frac{Vs - Vth}{h_{FE} \cdot R4} \quad (6)$$

$$I_B < \frac{Vs - Vth}{h_{FE} \cdot R4} \quad (7)$$

The switching transistor 107 is turned to an off-state when the above described inequality (6) is satisfied and is turned to an off-state when the above described formula (7) is satisfied. Such states will be described with reference to FIGS. 3 and 4A to 4E.

Figure 3:
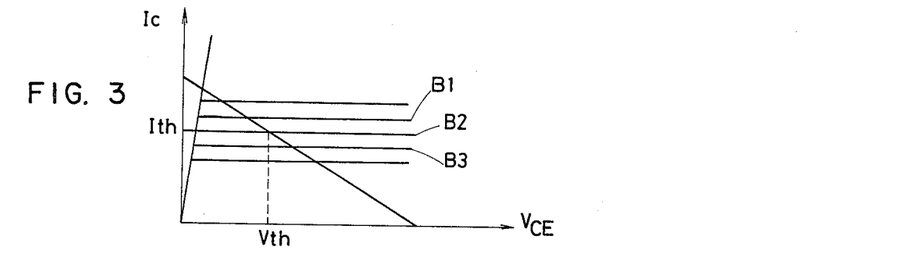
FIG. 3 is a graph showing a static characteristic of a transistor for explaining the operation of the embodiment.
Figure 4A:
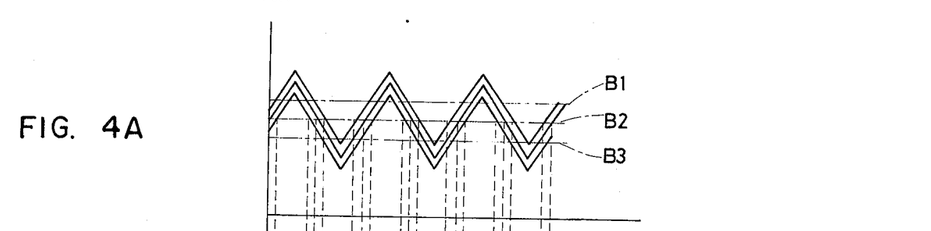
Figure 4B:
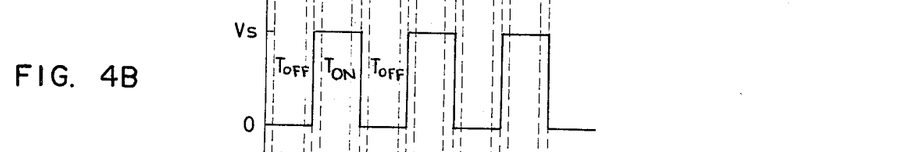
Figure 4C:
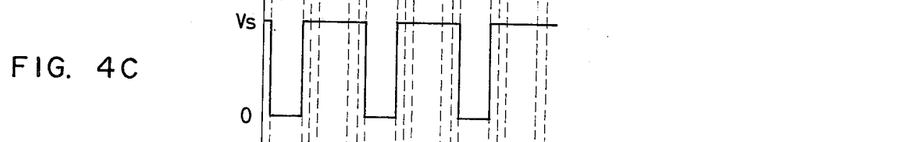
Figure 4D:
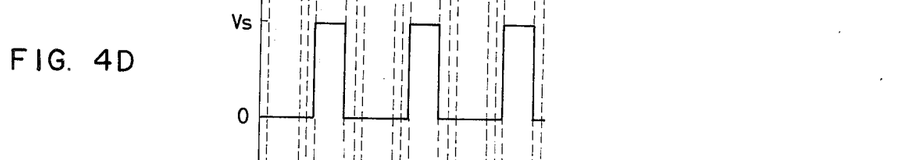
Figure 4E:
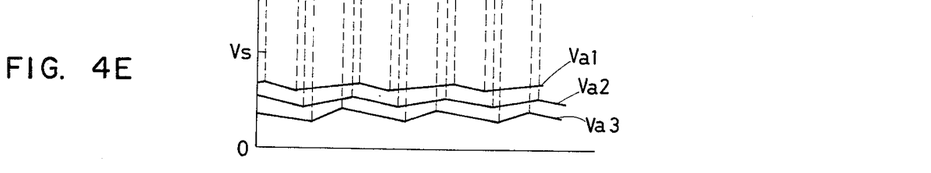

FIG. 3 is a graph showing a static characteristic of the first control transistor 112. Referring to FIG. 3, the abscissa indicates a voltage $V_{CE}$ between the collector and the emitter of the transistor 112 and the ordinate indicates a collector current $I_C$ of the same. FIG. 4A shows different base currents of the first control transistor 112, wherein that including a ripple component is shown by the solid line and the mean values are shown by the dotted lines as B1, B2 and B3. FIGS. 4B to 4D show the waveform of the collector voltage of the switching transistor 107 on the occasion of the respective biases. FIG. 4E shows different voltage waveforms as Va1, Va2 and Va3 at the supply point A to the bridge circuit 101 on the occasion of the respective cases shown in FIGS. 4B to 4D, respectively.

Referring to FIG. 3, B1, B2 and B3 denote the direct current bias point of the transistor 112 in various kinds of a load state. Referring to FIG. 3, in the case where the voltage $V_{CE}$ between the collector and the emitter of the first control transistor 112 is higher as compared with the operation threshold value voltage Vth as a reference, the second control transistor 115 is biased and the switching transistor 107 is driven, whereby the switching transistor 107 is placed in an on-state. Conversely, when the voltage $V_{CE}$ is lower than the reference voltage Vth, the second control transistor 115 is not biased and accordingly the switching transistor 107 is turned off.

It is assumed that in a steady state the bias of the first control transistor 112 is at the point B2 shown in FIG. 3. As seen from the above described equation (5), the bias point of the detecting transistor 110 fluctuates depending on a ripple component being applied to the bridge circuit 101. Therefore, the collector current of the detecting transistor 110, i.e. the base current of the first control transistor 112 also repeats an increase and decrease in accordance with such ripple component. FIG. 4A is a graph representing such state. As described previously, referring to FIG. 4A, if the base current $I_B$ of the transistor 112 is larger than the operation threshold value current $I_{B}th$ represented by the following equation (9), the switching transistor 107 is turned off and, if the base current $I_B$ of the transistor 112 is smaller than the operation threshold value current $I_{B}th$ represented by the following equation (9), the switching transistor 107 is turned on.

$$I_{Bth} = \frac{V_s - V_{th}}{h_{FE} \cdot R_4} \quad (9)$$

Accordingly, the voltage at the collector of the switching transistor 107 becomes as shown in FIG. 4B. When a given number of revolutions of a motor is set, a proper voltage Va having a relation of the above described equation (5) depending on the ratio of the on-period $T_{ON}$ and the off-period $T_{OFF}$ is applied to the bridge circuit 101. Meanwhile, the voltage Va is expressed by the following equation (10):

$$Va = \frac{T_{ON}}{T_{ON} + T_{OFF}} V_s \quad (10)$$

where a saturated voltage of the switching transistor 107, a resistance of the inductor 108 and a forward directional voltage across the flywheel diode 118 are to be neglected. On the other hand, the current Is being supplied from the direct current voltage source 106 at that time is expressed by the following equation (11) with respect to the current Im flowing through the armature 105 of the motor:

$$Is = \frac{T_{ON}}{T_{ON} + T_{OFF}} Im \quad (11)$$

When the load of the direct current motor is increased and the number of revolutions of the motor is decreased, a counter electromotive force E taking place in the armature 105 is decreased and accordingly the emitter potential of the detecting transistor 110 is decreased. Therefore, the collector current of the detecting transistor 110 and thus the base current $I_B$ of the first control transistor 112 is also decreased. Assuming that the bias at that time is at the point of B3 shown in FIG. 4A, the collector voltage of the switching transistor 107 is as shown in FIG. 4C. More specifically, the on-period $T_{ON}$ of the switching transistor 107 becomes longer and the off-period $T_{OFF}$ of the switching transistor 107 becomes shorter. As a result, as is seen from the above described equation (10), the voltage Va being applied to the bridge circuit 101 is increased and the number of revolutions of the direct current motor is also increased, whereby the direct current motor maintains rotation at the predetermined constant number of revolutions.

Conversely, in the case where the load of the direct current motor is decreased, the above described situation is reversed and the bias current of the first control transistor 112 comes at the point of B1 shown in FIG. 4A and the collector voltage of the switching transistor 107 is as shown in FIG. 4D. Thus, it would be appreciated that as is seen from FIG. 4E the voltage Va being applied to the bridge circuit 101 changes as Va2, Va3 and Va1 as shown in FIG. 4E. Meanwhile, as shown in FIG. 4E, the voltage Va being applied to the bridge circuit 101 changes without remaining as a constant direct current voltage. Accordingly, the voltage being applied to the armature 105 also changes accordingly. However, since the inertia of the direct current motor and the driving system thereof is sufficiently large as compared with the oscillation frequency, there is no influence at all being caused by such ripple component upon the direct current motor.

Whereas a conventional electronic governor employing a bridge circuit has controlled the number of revolutions of a direct current motor by changeably controlling an internal impedance of a transistor for controlling a supply of an electric power responsive to the output of a detecting transistor, the present invention is adapted such that the output voltage of the detecting transistor 110 is subjected to pulse width modulation, as described previously, by means of the first control transistor 112 and the second control transistor 115, whereby an on-period $T_{ON}$ and an off-period $T_{OFF}$ of the switching transistor 107 are controlled. The pulse having such duty factor, i.e. the ratio of the time periods $T_{ON}$ and $T_{OFF}$ is converted into a direct current voltage Va shown by the previously described equation (10) by means of the inductor 108, the capacitor 117 and the flywheel diode 118, whereby the direct current motor is controlled. Thus, according to the present invention, since the switching transistor 107 is utilized in the cutoff region and the saturated region, the conventional energy loss consumed due to a voltage drop across the supply control transistor is eliminated as a matter of principle, apart from a loss on the occasion of switching. Accordingly, the consumed current is reduced as shown by the previously described equation (11) and as a result the life of the battery being used as the direct current voltage source 106 is drastically prolonged.

According to the experimentation conducted by the inventors, the respective components included in the FIG. 2 embodiment were as shown in the following in accordance with one example of designing.

voltage Vs of the direct current voltage source 106 . . . 6 V switching transistor 107 . . . 2SB598 detecting transistor 110 . . . 2SA608 first and second control transistors 112 and 115 . . . 2SC536 resistor 102 (R1) . . . 3 Ω resistor 103 (R2) . . . 850 Ω resistor 104 (R3) . . . 2.2 kΩ resistor 111 . . . 10 kΩ resistor 113 . . . 10 kΩ resistor 114 (R4) . . . 8.2 kΩ resistor 116 . . . 680 Ω inductor 108 . . . 200 μH capacitor 109 . . . 0.22 μF capacitor 117 . . . 100 μF flywheel diode 118 . . . DS442

Figure 5:
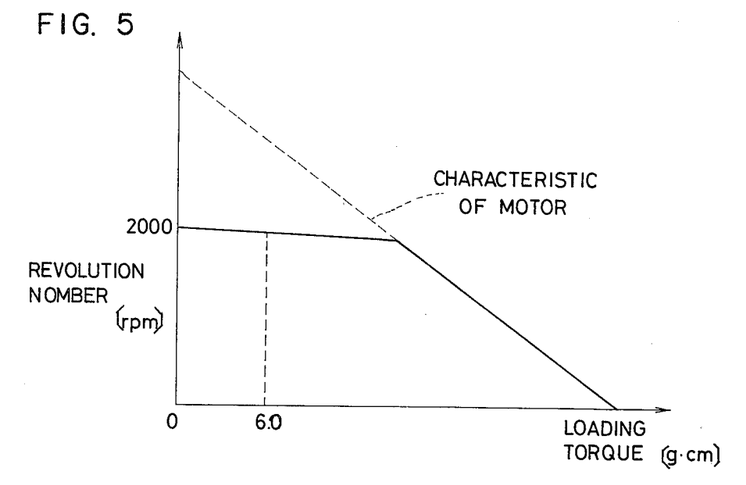
FIG. 5 is a graph showing one example of the number of revolutions with respect to a loading torque of a direct current motor shown in the FIG. 2 embodiment.

In the case of the above described example, the oscillation frequency was approximately 40 kHz. The rated number of revolutions of the direct current motor was 2000 rpm and the rated load was 6 gcm. The direct current resistance Ra of the armature 105 of the motor was 8 Ω. According to the above described example, a torque to revolution number characteristic as shown in FIG. 5 was obtained. The load fluctuation was 1 to 2%/gcm.

Figure 6:
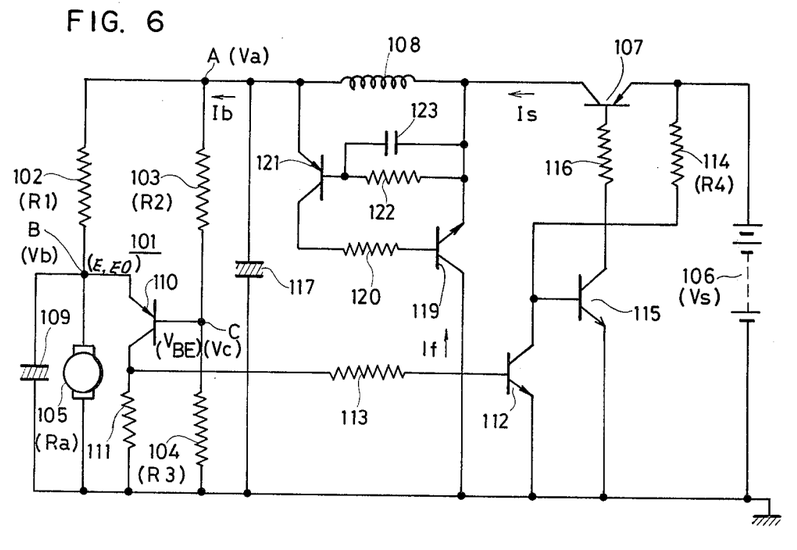
FIG. 6 is a schematic diagram showing another embodiment of the present invention.

FIG. 6 is a schematic diagram of another embodiment of the present invention. The embodiment shown is substantially the same as the FIG. 2 embodiment, except that a set of transistors 119 and 121 is employed in place of the diode 118 in FIG. 1. More specifically, in the case of the FIG. 3 embodiment, the emitter-collector path of the transistor 119 is connected between the inductor 108 at the side of the switching transistor 107 and the ground so that a closed loop may be formed to supply a current to the bridge circuit 101 from the inductor 108 while the switching transistor 107 is in an off-state. The base of the transistor 119 is connected to the collector of the transistor 121 through the resistor 120. The emitter of the transistor 121 is connected to the inductor 108 at the side of the bridge circuit 101. The base of the transistor 121 is connected through a parallel connection of the resistor 122 and the capacitor 123 to the inductor 108 at the side of the switching transisor 107 and thus to the emitter of the transistor 119.

When the switching transistor 107 is in an on-state, the transistor 119 and the transistor 121 are in a reversed bias state, so that both are in an off-state. When the number of revolutions of the motor increases in such a situation so that the switching transistor 107 turned to an off-state, then a electromotive force is generated in the inductor 108 and at the same time the transistors 119 and 121 are both biased to be reversed to an on-state. As a result, a current by virtue of the induced electromotive force taking place in the inductor 108 is supplied through the collector-emitter path of the transistor 119 to the above described bridge circuit 101.

According to the FIG. 6 embodiment, the transistor 119 is employed as a means for supplying the electromotive force generated in the inductor 108 to the bridge circuit 101 when the switching transistor 107 is reversed to an off-state and therefore no voltage drop is caused as compared with the FIG. 2 embodiment employing a diode and hence the current can be effectively supplied.

Meanwhile, both the above described two embodiments employed PNP transistors as the detecting transistor 110 and the switching transistor 107 and NPN transistors as the first control transistor 112 and the second control transistor 115; however, it is a matter of course that transistors of the opposite conductivity types may be employed by properly designing the circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A speed control apparatus for a direct current motor, comprising:
    first and second terminals adapted to receive a dc current;
    bridge circuit means including four arms, three of said arms comprising resistive means and the remaining arm comprising an armature of said motor, said bridge circuit further including unbalanced voltage detecting points;
    unbalanced voltage detecting means responsive to a voltage appearing at said unbalanced voltage detecting points for detecting the unbalanced voltage of said bridge circuit means;
    switching means coupled between said direct current voltage source means and said bridge circuit means for conducting or interrupting a supply of said dc current received from said first and second terminals;
    control means responsive to said unbalanced voltage detecting means for turning said switching means to an on-state or an off-state;
    inductor means coupled between said switching means and said bridge circuit means; and
    induced electromotive force supply means coupled to said bridge circuit for supplying thereto and induced electromotive force developed in said inductor means when said switching means is brought to an off-state.

2. A speed control apparatus in accordance with claim 1, which further comprises
    on/off-period restricting means for restricting an on/off-period of said switching means by restricting a voltage change of one of said two unbalanced voltage detecting points of said bridge circuit means.

3. A speed control apparatus in accordance with claim 2, which further comprises means for providing a reference potential, and wherein
    said armature is connected between one of said two unbalanced voltage detecting points of said bridge circuit means and said reference potential providing means, and
    said on/off-period restricting means comprises first capacitor means connected in parallel with said armature.

4. A speed control apparatus in accordance with claim 3, which further comprises
    second capacitor means coupled to a junction between said inductor means and said bridge circuit means and said reference potential providing means for reducing a ripple component included in a direct current voltage being applied to said bridge circuit means.

5. A speed control apparatus in accordance with claim 2, wherein
    said switching means comprises switching transistor means having an input electrode connected to said control means, said switching transistor means operating in a saturated region when said switching transistor means in an on-state.

6. A speed control apparatus in accordance with claim 5, wherein
    said detecting means comprises detecting transistor means having an emitter, a base and a collector, said emitter or being connected to said one of said two unbalanced voltage detecting points in said bridge circuit means, said base being connected to the other of said two unbalanced voltage detecting points in said bridge circuit means, and said collector providing an output voltage, and
    said control means is responsive to the output voltage of said detecting transistor means for controlling said switching means to be in an on-state or an off-state.

7. A speed control apparatus in accordance with claim 6, wherein
    said control means comprises control transistor means having an input electrode connected to received output voltage of said detecting transistor means and responsive to the output applied to said input electrode for bringing said switching transistor means to be in a saturated region or in a cutoff region.

8. A speed control apparatus in accordance with claim 1, wherein
    said induced electromotive force supplying means comprises diode means connected substantially in parallel with said bridge circuit means through said inductor means in a predetermined direction in accordance with the polarity of said direct current voltage source means.

9. A speed control apparatus in accordance with claim 1, wherein
    said induced electromotive force supplying means comprises a transistor connected substantially in parallel with said bridge circuit means through said inductor means in a predetermined direction in accordance with the polarity of said direct current voltage source means, and means responsive to a voltage at an output of said switching transistor for turning said transistor on or off.

* * * * *